United States Patent
Considine et al.

(10) Patent No.: US 9,208,692 B2
(45) Date of Patent: Dec. 8, 2015

(54) SYSTEM FOR MEASURING SPEED AND MAGNITUDE OF RESPONSES AND METHODS THEREOF

(75) Inventors: Gary Considine, Los Angeles, CA (US); Rita Considine, Los Angeles, CA (US); Timothy Harvey, Temecula, CA (US); Michael Linn, Simi Valley, CA (US)

(73) Assignee: The Herman Group, Co., Los Angeles, CA (US)

( * ) Notice: Subject to any disclaimer, the term of this patent is extended or adjusted under 35 U.S.C. 154(b) by 430 days.

(21) Appl. No.: 13/270,947

(22) Filed: Oct. 11, 2011

(65) Prior Publication Data

US 2012/0088222 A1    Apr. 12, 2012

Related U.S. Application Data (60) Provisional application No. 61/391,898, filed on Oct. 11, 2010.

(51) Int. Cl.
*G09B 7/00* (2006.01)
*G09B 7/02* (2006.01)
*G09B 5/00* (2006.01)

(52) U.S. Cl.
CPC ... *G09B 7/02* (2013.01); *G09B 5/00* (2013.01)

(58) Field of Classification Search
CPC .......................................................... G09B 5/00
See application file for complete search history.

(56) References Cited

U.S. PATENT DOCUMENTS

| | | | | |
|---|---|---|---|---|
| 3,453,753 | A * | 7/1969 | Farnum | 434/350 |
| 5,965,856 | A * | 10/1999 | Okada et al. | 200/85 A |
| 2005/0130110 | A1* | 6/2005 | Gosling | 434/322 |
| 2005/0191609 | A1* | 9/2005 | Fadel et al. | 434/322 |
| 2007/0009870 | A1* | 1/2007 | Kallander | 434/350 |

\* cited by examiner

*Primary Examiner* — Kesha Frisby
(74) *Attorney, Agent, or Firm* — Jeffrey A. Pine; Dykema Gossett PLLC (57) ABSTRACT

A system and methods for providing input devices or sensors to record users' responses or answers to questions and the conviction of those answers by measuring and tracking various metrics, including the speed, direction and magnitude or power of a response to the question, and calculating the score thereof.

35 Claims, 4 Drawing Sheets

SYSTEM FOR MEASURING SPEED AND MAGNITUDE OF RESPONSES AND METHODS THEREOF

PRIORITY STATEMENT

This application claims the benefit of U.S. Provisional Application 61/391,898 filed Oct. 11, 2010.

FIELD OF THE INVENTION

The present invention relates generally to measuring users' intellectual and strategic physical skills under various constraints, and more specifically to a system and methods for providing input devices or sensors to record users' physical responses or answers to questions or challenges and the conviction of those answers by measuring and tracking various metrics including the speed and magnitude or power of a physical response to the question.

The present invention relates to a tool to motivate, encourage, train, test, record, track, compete, and communicate results to one or more users of the system, either individually, as a group or against one another simultaneously or at different times. The system and methods provide a teaching tool to train users in technique, and provide functionality to increase knowledge, and to improve or increase effort to assist in both technique and knowledge.

The present invention relates to both physical and mental training and testing in a stand alone mode as a separate system including, in the preferred embodiment, at least one sensor and a trainer for the physical training; as software installed on a computer system or game console (with or without external sensors); and as a web-based system on one or more operating platforms. While the stand alone mode allows use of the system anywhere with assured privacy, the web-based embodiment allows for increased public access and social networking. The present invention also relates to an interactive TV environment to provide some or all of the functionality set forth herein.

The present invention relates to prompting, recording, and tracking physical and mental activities and challenges to train the body and the mind, recording answers and conviction for mental questions or challenges, and recording repetitions, power, effort and speed for physical challenges. The present invention thereby provides immediate, objective performance feedback, which is tied to pre-determined thresholds at pre-selected points. Further, all of the platforms, such as pc, Mac, Linux, iPad, Android, and Blackberry, as described herein, recognize keyboard depressions. To make the present invention ubiquitous across all platforms, the sensors can convert impact information or captured scores to keyboard depressions. This methodology permits direct input of the sensors to the computer, tablet, or phone or permits communication through a Bluetooth keyboard.

The present invention relates to measuring the conviction of the user's answer and thus minimizes guessing. This can be done when the user strikes one of the impact sensor pads with a force consistent with the certainty of the response. This can also be done by squeezing one of the pressure sensors with a strength and/or duration to reflect the certainty of the response, and this can be done through the manipulation of the answer key—either the time duration the key is depressed within a designated time frame, the number of times the key is depressed in a designated time frame, the combination of key depressions that signify answer and conviction. or the size of the imprint upon a touch pad screen.

The present invention also relates to using videos for interactive training and testing and entertainment to assist in measuring mental accuracy, opinions, and conviction. Assistance in instructing, informing, training and testing, entertaining, surveying, and testing is accomplished using original videos, video clips, text, photos, audio, title cards, and other forms of visual and audio communication. Using the system embodied by the present invention, users are guided to remedial, normal, or advanced next steps based on performance, while their personal and/or group progress is tracked.

As such, the present invention relates to using in a number of learning, evaluation, competition, entertainment and/or game environments in which intelligence, speed, relative strength and strategy are necessary to attain the highest possible score in response to questions or challenges in a variety of subjects or in a particular subject area. The difficulty of these questions or challenges can be set or can vary and a handicapping program can create better competition between users or players of different abilities. Further, the present invention relates to tracking a user's answers and history, whether at the same location or terminal, or elsewhere, and dynamically handicap or provide progress charts or reports for that user.

Both the physical and mental training and testing can incorporate objective or subjective training and testing or questions. As such, the questions can be objective questions with right and wrong answers, subjective questions with information from player, or subjective questions with opinions from player. The questions can be presented as various types that most users are comfortable with, such as multiple choice, true or false, matching, short answer, or short essay.

Scoring for mental or physical training and testing can be customized by establishing a baseline for an individual or a group, such that after initial testing, scores for that particular individual can then be compared to the baseline (rather than the raw score). The power of the conviction in a response can be measured as a percentage of a maximum response or impact during baseline testing.

The present invention relates to a learning tool for self-improvement and to retain and improve one's mental abilities, and can be used as a simulation system for first responders, pilots, soldiers and athletes, among others, and can be geared to test and measure the conviction of decisions to various virtual situations before having to respond to those actual situation in the real world environment. Further, the present invention relates to a rehabilitation tool for patients recovering from stroke or neurological damage, and for pre-game sports preparations, measuring the player's conviction of an answer to various questions or challenges, thereby reducing mental mistakes during the game.

BACKGROUND OF THE INVENTION

Learning tools have been around for years and have been used to teach different subjects, for self-improvement and to allow the user to remain mentally sharp. Learning tools can be as simple as flash cards and as complex as a computer system that provides questions and answers to the user. Learning tools can function specifically as a learning tool or can be used in a game environment, so that playing the game provides similar results to using a learning tool.

Similarly, games such as video games have been used to teach, train entertain and record an individual's performance in responding to the game stimuli. Entertainment consoles, such as the Xbox, Sony PlayStation and Nintendo Wii are configured to play games with one or many players and even play against others over a global communications network, such as the Internet.

However, there is currently no system nor any related methods for providing input devices, such as sensors or keyboards, to record a user or users' responses or answers to questions or challenges and to record and score the conviction of those answers by measuring and tracking various metrics, including the speed and magnitude or power of a response to the question, such as by striking or manipulating the keys of a keyboard or impacting a sensor.

Further, there is no system that uses the information recorded for a player or players and generates tables, graphs or other records of these types of responses and also provides a static and dynamic handicapping program to normalize the game or learning tool for each player whether playing the game alone or against other players.

SUMMARY OF THE INVENTION

The present invention is a system and methods for measuring the intellectual and strategic skills of a user under various constraints, such as time and force. The present invention utilizes input devices such as impact and pressure sensors, keypads or keyboards, mobile device touch pads, microphones, grips and ankle or wrist cuffs, all with or without accelerometers and/or gyroscopes, to record and track various metrics, such as the speed, magnitude and direction of the users' response or answer to questions or challenges on a number of different subjects or on a single topic, thereby determining the conviction of the users' answers.

The present invention can be used with its own, or with an existing, data gathering platform that is configured to receive data from an external source or sensor. These platforms include personal computer systems, smart phones, tablets and game consoles, for example the Sony PlayStation, the Nintendo Wii and the Microsoft XBox. To the extent a particular platform includes input devices, such as external or integrated sensors, or even keyboards, the present invention can be incorporated into that platform. As described in detail herein, the present invention is capable of converting or translating sensor impacts into the equivalent of keyboard strikes or depressions that can be read by any platform or any standard computer system.

Further, the present invention can be configured to use a wireless router or a Multiple Wireless Receiver (MWR) that communicates with many types, and an almost unlimited number, of wireless sensors including the impact sensors, keyboards, pressure sensors, security sensors, and health monitoring sensors described herein.

In an embodiment of the present invention, either using the stand alone system as described above or as a software system installed on a personal computer or the like, or as a web based system, videos are incorporated for interactive training and testing using, for example, the keyboard of the computer, to assist in measuring the user's mental or physical accuracy, opinions, and conviction of the response. By using audio and video media, the user can be instructed, informed, trained, entertained, and tested in accordance with the present invention. These audio and video media include, but are not limited to original videos, video clips, text, photos, audio, title cards, and other forms of visual and audio communication.

The monitoring works with or without additional hardware; and the subscriber has the choice. As described herein, the power recorded by wired or wireless sensors is converted into keyboard strikes, such as in accordance with the Bluetooth standard. This eliminates the need for a trainer and permits the web-based application. This web-based platform includes the features described herein that provide different video progress and action reports based on established performance thresholds. Additionally, the present invention allows for the user or subscriber to be guided to specific action steps, such as redoing a lesson, taking an easier lesson, or lowering the difficulty level of the questions.

The present invention, which currently has been commercialized as the My Herman System for physical training and testing, and as the Mind Power System for mental training and testing, is also capable of functioning as a web-based system on one or more operating platforms (with the Herman U System) or an interactive TV environment, which provides entertainment applications, as all of these systems are further described herein. While the stand alone mode allows use of the system anywhere with assured privacy, the web-based embodiment allows for increased access and social networking.

Using such a system, users are automatically guided to the next step of the program, whether at the remedial, normal, or advanced level. These next steps are based on the user's previous performance and their personal and/or group progress is tracked simultaneously. When necessary, the system can stop the testing for very poor performances or questionable answers to specific questions or challenges. The system measures power, speed, accuracy, and conviction and is capable of conducting real time competitions online and at live events In the preferred embodiment, the present invention can be incorporated into the impact-sensing and measurement system described and claimed in U.S. Pat. No. 7,308,818, the disclosure of which is incorporated by reference herein. The present invention builds on the patented impact sensing and measurement technology to measure users' intellectual and strategic skills in a timed environment and further can be used to measure users' physical skills against him or herself, other users, or a user group, and to measure users' intellectual and strategic skills in a timed environment.

The present invention makes use of various input devices or sensors to record a user's response or answer to one or more questions or challenges, and measures, at a minimum, the speed and magnitude or power of the user's responses to calculate the conviction of the answers. The present invention scores and tracks the user's answers and ranks the performance. In doing so, the present invention can measure both mental and physical tasks and can be part of a comprehensive mental and physical fitness program. The same system that works for mental tests can also be used for physical tasks or exercises and the same input devices or sensors can be used for both. The present invention can utilize all mental questions or challenges or all physical tasks or a combination of mental questions or challenges and physical tasks.

The present invention can be implemented as a personal software-driven game that includes many topics with a wide range of questions or challenges to create a competitive learning experience for individuals and groups of all sizes and ages. Using hand grips for example, the present invention can measure the strength of the hand grip and the direction and number of the movements. Using wrist or ankle cuffs, it can measure the strength of the movement or pressure of the movement as well as the direction. These grips and wrist or ankle cuffs may be stand alone pieces of equipment or accessories to existing equipment and may or may not include a gyroscope as well as impact or pressure sensors.

Players compete against themselves or against others in a fast-paced test of confidence, knowledge, conviction, strategy, and speed. A video or virtual host can be used to present the questions or challenges and can even react in a variety of ways to correct and incorrect answers. The present invention incorporates general and custom video content including questions or challenges, answers, talks, lectures, instructions, examples, and tips for the mental and physical tasks. The specific content can be triggered by the individual and cumulative question/task performance of the player. The players answer questions or challenges by indicating information to a sensor, such as hitting an answer pad, moving their bodies (with sensors attached), moving equipment or moving an answer stick. Either way, the response must be as quick as possible and with as much certainty as the user has to indicate the conviction of the answer and score the most points.

Accordingly, it is an object of the present invention to provide a game of intelligence, speed, and strategy, that can be played by one or more players, as a stand-alone console or connected to other players online, using questions or challenges on variety of subjects and of varying difficulty to record players' responses, calculate scores, rank performances and track progress.

It is also an object of the present invention to provide a test preparation system to track answers and progress based on historical information for a particular user or users, that removes the frequent boredom of learning tools and creates an interesting and exciting learning tool.

It is another object of the present invention to provide a tool for people of all ages for self-improvement and to allow individuals to remain mentally sharp.

It is another object of the present invention to provide questions or challenges during the learning session or game that can be customized for desired goals from kids to adults to seniors.

It is another object of the present invention to provide an integrated system to motivate, encourage, train, test, record, track, compete, and communicate results to one or more users of the system, either individually or against one another simultaneously or at different times. Further, the users' scores can be reviewed and monitored in person or remotely by a teacher, trainer, therapist or some other professional.

It is another object of the present invention to provide a teaching tool to train users in technique, to increase knowledge, and to improve or increase effort to assist in both of these.

It is yet another object of the present invention to provide a rehabilitation tool, for patients recovering from stroke or a neurological incident, in which questions or challenges can be customized for timed responses during the rehabilitation process, and in which results can be tracked to measure and record improvements.

It is another object of the present invention to provide a pre-game sports or event preparation tool, in which sensors are used to measure the conviction of the player's answers to game play and possible situations, thereby permitting athletes and other participants to measure the certainty of their action and reduce mental mistakes before the actual game or event. As described herein, the system can be geared as a simulation system for athletes to test and measure the conviction of decisions to various virtual situations before having to respond to those situations in actual competition.

It is another object of the present invention to provide a game format for one-on-one and group competitions at events or for video games and television shows.

Other objects and advantages of the present invention will become apparent to one having ordinary skill in the art after reading the specification in light of the drawing figures, however, the spirit and scope of the present invention should not be limited to the description of the embodiments contained herein.

BRIEF DESCRIPTION OF THE DRAWING

The preferred embodiments of the invention will be described in conjunction with the appended drawings provided to illustrate and not to the limit the invention, where like designations denote like elements, and in which.

DETAILED DESCRIPTION OF THE PREFERRED EMBODIMENT

The present invention can measure both mental and physical tasks and can be part of a comprehensive mental and physical fitness program. As such, the same system that works for mental tests can also be used for physical tasks or exercises and the same input devices or sensors can be used for both. The present invention can utilize all mental questions or challenges or all physical tasks or a combination of mental questions or challenges and physical tasks.

All of the platforms described herein recognize keyboard depressions. To make the system ubiquitous across all platforms, such as pc, Mac, Linux, iPad, Android, and Blackberry, the sensors, as described in detail herein, can convert impact information or captured scores to keyboard depressions. This methodology permits direct input of the sensors to the computer, tablet, or phone or permits communication through a Bluetooth keyboard.

Figure 1:
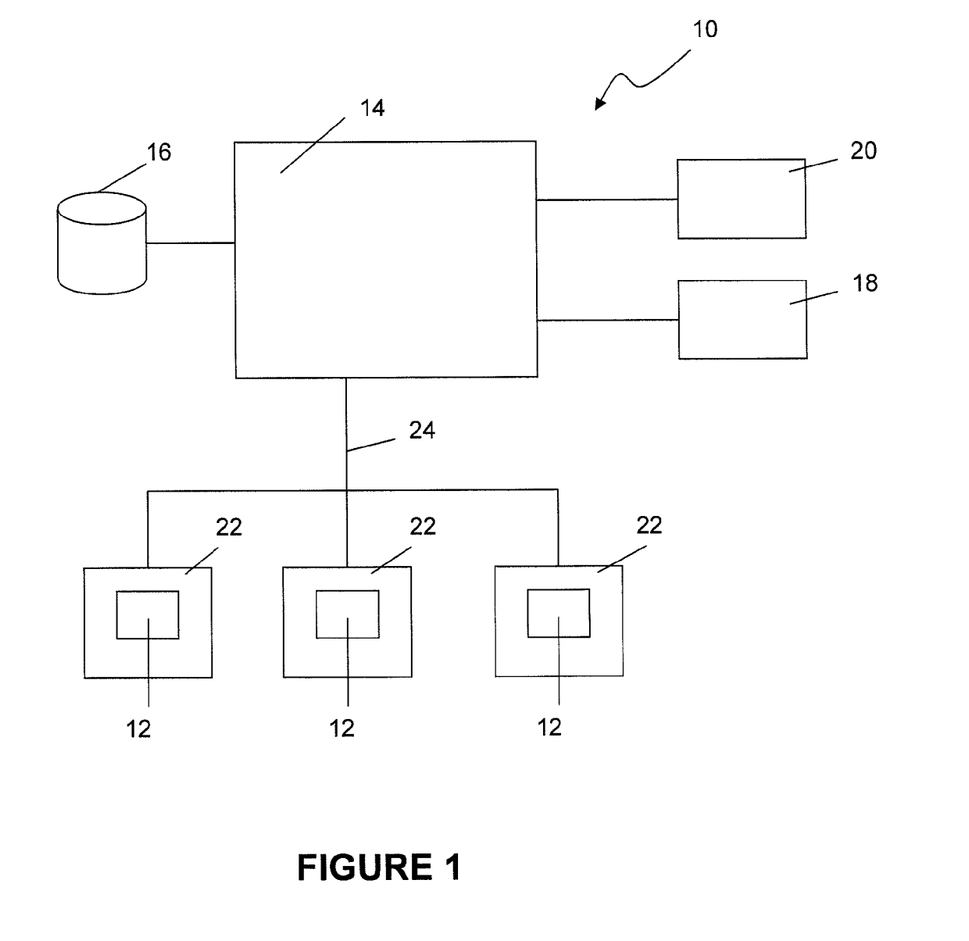
FIG. 1 illustrates a functional block diagram of a stand alone system in accordance with an embodiment of the present invention.

FIG. 1 shows the present invention, which is a microprocessor-based system 10 running a software program that allows for the entry of information or data from external or integrated sensors 12, and uses the data it receives in response to a number of questions or challenges to determine the users' conviction to the answers to those questions or challenges. The system 10 can be used with any data gathering platform 14, such as a personal computer system, smart phone, tablet and game console, that can receive data from input devices 12 such as impact and pressure sensors, keypads, mobile device touch pads, grips and ankle or wrist cuffs, microphones, all with or without accelerometers and gyroscopes. To the extent a particular platform already includes input devices or sensors 12, either integrated or external, the present invention can be incorporated into that system. An embodiment of the present invention is configured to convert or translate sensor impacts into the equivalent of keyboard strikes or depressions that can be read by any platform or any standard computer system. For an example, whereas a sensor would receive and determine that an impact was measured at 10 Gs, the signal sent to the system would be the equivalent of a keyboard in which the "1" key was depressed, followed by the "0" key, followed by the "G" key (with any necessary handshaking between the systems applied), as though the input was entered on a keyboard.

As described herein in more detail, the present invention generally allows for the communication between sensors and translates the information received from those sensors into scores for personal and remote monitoring. The system works as a stand alone system (with single and multiple wired or wireless sensors), or can be web-based operating on all types of platforms and using a sensor as simple as a keyboard, and can work for individual and group training and testing, and for competitions. The system provides audio and visual cues, scores, and feedback in multiple languages, and can provide reminder videos or alerts before the workout interval starts.

Real time graphs and scores can be displayed for every impact and the scoring formula is adjustable to address baselines, handicaps, different sensor types, physical limitations of sensors (through extrapolation math), axis isolation, conversions, and sensor positioning (through implied scoring). Percentage change from target comparison can be displayed and many levels of text, audio, and video feedback can be provided that corresponds to that percentage change up or down.

The system can also incorporate training and testing, and countdown videos and remedial teaching videos (based on performance) into the workout intervals, and detail the feedback to address the specific reason for the difference in score, including the number of repetitions, accuracy of movements, power of movements, speed of movements, angle of movements, and play the appropriate teaching feedback video.

Progress videos can be provided at pre-set points based on overall workout performance. The present invention allows athletes to always compete against him or herself, but there is the option to also compete against another athlete's scores. Along those lines, photographs or video of the other player can be displayed for competitive reasons.

The system allows for customization of workouts, techniques, intervals, and rest periods, thereby creating power, speed, power and speed, and burnout workouts. In other words, the user can select preference profiles for training and testing and can customize the person and/or voice providing the training and testing, encouragement, and feedback, including in multiple languages. The present invention allows for competitions and performance rankings, and can track personal and group progress for every technique and workout for every user.

As described in more detail below, the system scores impacts and movement in g-force, converts movement to other measurements (PSI, speed, distance, calories burned), scores the overall, simultaneous impact on all 3 axis only the desired direction and axis for particular movement related to selected activity, and rewards hardest or lightest impacts depending on desired use.

The system works with many types of sensors (low-high impact accelerometers, gyroscopes, pressure sensors, pedometers, health sensors, etc), and tracks individual sensor scores as well as best of all or average of all sensor scores. Single and multiple sensor graphs of current, prior, and best performances for each technique along with the scores are displayed and stored to compare over time. The interval graphs can be replayed in real time. Accordingly, every competitor for every technique and every total workout can be ranked.

The system can create custom workouts that can be downloaded through to the user's personal Trainer.

In the preferred embodiment, the present invention is a system and related methods that incorporates a physical training and testing system and a mental training and testing system, is capable of functioning in a software mode on existing platforms, as a web-based system on one or more operating platforms or in an interactive TV environment, which is capable of providing entertainment applications. All of these systems can be used together or separate and while a stand alone mode allows use of the system anywhere with assured privacy, a web-based embodiment allows for increased access and social networking.

The preferred embodiment however is used with the impact sensing and measurement system described and claimed in U.S. Pat. No. 7,308,818, which is incorporated by reference herein. The present invention builds on the patented impact sensing and measurement technology to measure users' intellectual and strategic skills in a timed environment, and further measure users' physical skills against him or herself, other users, or a user group, and to measure users' intellectual and strategic skills in a timed environment.

The system 10 of the present invention makes use of various input devices or sensors 12 to record a user's response or answer to one or more questions or challenges, and measures, at a minimum, the speed and magnitude of the response to calculate the conviction of their answer. The present invention monitors and tracks the user's answers, including the monitoring of the speed or the speed and magnitude of the responses, and can then score or rank the performance. Similarly, the system 10 can challenge the user to take an action, such as kickboxing, punching, weightlifting, etc. and the system 10 can monitor the results of the user's actions in response to the challenge.

The present invention can be implemented as a personal software-driven game stored on a database 16 that can include many topics with a wide range of questions or challenges to create a competitive learning experience for individuals and groups of all sizes and ages.

In the preferred embodiment, users can either compete against themselves or against others in a fast-paced test of confidence, knowledge, conviction, strategy, and speed. Questions or challenges can be presented to a user in a number of ways including audio—through a speaker 18, video—through a display 20, or a combination of these. In the preferred embodiment, the questions or challenges are presented instantaneously to the user over a video display 20, which can then better calculate the amount of time it takes for the user to respond once the question has been provided.

Once the question has been presented, the user can react in a variety of ways to indicate correct or incorrect answers. The user can answer questions or challenges by moving their bodies if they are holding sensors 12, or wearing clothing (not shown) that contains sensors 12; moving an answer stick (not shown); or striking an answer pad 22. Further, the user can respond by depressing a key or multiple keys on a standard keyboard and manipulating those keys by the number of keys depressed (for example), the number of times a key is depressed, the length of time the key is depressed, or other pre-determined means of expressing the level of conviction. The action indicating the answer must be performed as quickly as possible and with as much magnitude or intensity as possible to score the optimal amount of points.

The present invention allows for the user to be tested for both physical and mental skills by measuring the conviction of the users answers through the physical response. Besides receiving instant feedback and corresponding scores, the system 10 can provide progress tracking and comparative scoring for various testing, either to the user or to other individuals using the system or assisting that user. Other users can be on the same system or connected through a communications network such as the Internet.

The present invention allows for constant updates to the questions or challenges that are asked to the users thereby making certain that the questions or challenges are current and not repeated. Thus, the questions or challenges and tests are never the same. Further, the system allows the option of presenting the questions randomly, either from the overall question pool or the subject-specific question pool, or using a difficulty level specific pool, so that the questions, challenges or tests presented are never the same.

Since the system detects both correct answers and the speed and magnitude of the response, the present invention requires strategy as well as skill and intellect to score the optimal amount of points. Further, the present invention can incorporate scoring handicaps and even penalties to keep the testing interesting and to force the user to revise certain strategies. The present invention provides for a variety of different tests for a serious learning tool as well as an interesting and enjoyable game, and can be programmed to automatically end when performance falls below a designated level or to trigger rewards when performance exceeds a designated level.

Using a stand alone system or connected through a global communication system such as the Internet allows for competition between users either in person or online.

As described herein, there are numerous ways in which the questions or challenges can be presented to the user. The present invention incorporates general and custom video content including questions or challenges, answers, talks, lectures, instructions, demonstrations, examples, and tips for the mental and physical tasks. The specific content can be triggered by the individual and cumulative question/task performance of the player.

The questions or challenges can be displayed as text on a monitor 20 or any other type of display such as a cellular telephone display or tablet. The question can be unveiled to the user letter by letter or word by word and an internal timer can begin when the last word of the question is displayed. The question can also appear in its entirety on the display 20 with the timer beginning when the question is displayed or allowing a period of time for the user to read the question.

The present invention can also provide the question in an audio only format through speakers 18 or headphones (not shown), which may provide a different outcome from the visually shown question, even for the same user. The combination of text and audio may also be used to provide the question.

Another embodiment provides for a photo or movie clip to be shown on a display 20 and the user must answer a question or respond accordingly based on the photo or movie.

Of course, any combination of text, audio, videos and photos can be combined with or without the other types to provide the question to the user. In each of these embodiments, if a timer is used, the timer begins when the question is provided (or a short time thereafter) and is synchronized to the answer cue, so that it stops when the user makes contact with one of the sensors 12 indicating a correct or incorrect answer.

The user may be allowed to provide an answer to the question in one of many ways. Answer pads 22, containing sensors 12 such as accelerometers, can be used for each of the possible choices of answers. These answer pads 22 can be embedded with one or more sensors 12 that transmit information through various types of transmission 24, including wired or wireless transmission. Also, an answer stick can be used containing an embedded sensor and gyroscope, for example. Wrist sensors can be placed on the user to track time, power and even direction of the user's response. A touch screen can also be used to detect power, speed and direction of the user's response. Further, multiple hand held sensors or sensors placed on the body can match answer and track power and speed. These sensors can be incorporated into gloves, vests, shirts, or other articles of clothing to provide data when the user responds to a question.

Using hand grips for example, the present invention can measure the strength of the hand grip and the direction and number of the movements. Using wrist or ankle cuffs, it can measure the strength of the movement or pressure of the movement as well as the direction. These grips, wrist and/or ankle cuffs may be stand alone pieces of equipment or accessories to existing equipment and may or may not include a gyroscope as well as impact or pressure sensors.

The present invention allows for a number of different scoring options depending on the type of learning tool or game, and also depending on the different physical embodiment of the system.

Of course, the main scoring is based on whether or not the user provides the correct answer to the question by making contact with the correct sensor 12. Assuming that the answer is correct and the system incorporates answer pads 22, the scoring can be increased or multiplied based on either the speed in which the user makes contact with the correct answer pad 22, or the magnitude or power of the user's response. In this case, the faster the correct selection is made or the greater the magnitude of the selection of the correct answer, i.e., the harder the user strikes the answer pad 22, the higher the score.

The scoring can be a function of both the speed of the response and the power of the response. The system checks for the correct answer and at the same time determines how long it took for the user to respond and how hard was the selection of the answer. To accumulate the most points for a question, the user must answer quickly and with a lot of force. This type of answer indicates that the user has great conviction in the answer and can score the maximum number of points.

The system can also determine the direction of the response along with the speed of the response. A quick answer that connects to the middle of the answer pad 22 indicates that the user was not hesitating or deciding between different answers (or answer pads 22). This speed and straightforward direction indicates the greatest conviction in the answer and thus the higher score. Accordingly, the system has the ability to use a single sensor to record the answer and power coming from the direction that the sensor is moved and the force of its movement. The sensor records the answer from the axis with the highest score. Similarly, speed, direction and power or magnitude of the response can all be used to determine the score of the correct answer. In this embodiment, the hardest, fastest and most direct selection generates the highest score.

The system 10 can implement varying levels of difficulty for the questions or challenges to increase or decrease difficulty. A number of additional scoring options can be implemented including negative scores or the subtraction of scoring points for incorrect answers or failing to respond to the question in time. The negative scoring could be a pre-set formula as well as the same formula used for correct answers (but with a negative component), or a more severe negative formula can be used. The system 10 can generate a handicap to account for different ages, weights, gender, and even base the handicap on past performance. Further, a test can be run before beginning play, or even simultaneously during play, to determine the greatest magnitude for which a user can make a selection, thereby ensuring that a stronger user does not accumulate more points merely because the user can strike the answer pad 22 with a greater force than another.

The system 10 can also provide for second chance questions or challenges if a question was previously missed. Further, the system 10 can be set up for bonus questions or challenges or a bonus round depending on how well a user performs. The bonus questions or challenges or bonus round may even take on more of a physical element.

In the preferred embodiment, the system 10 is set up as a learning tool or game in which players compete against themselves and/or each other. The game play can be set such that each player starts and finishes a game before another player starts. In this embodiment, the player receives a number of questions or challenges, for example ten questions or challenges and a score is generated based on that player's responses as described above.

In an alternative embodiment, the game will alternate questions or challenges between players, either after each question or after a predetermined number of questions or challenges. For example, if the predetermined number of questions or challenges is three, each player must answer the three questions or challenges received before the next player receives questions or challenges. This rotation, between two or more players continues until all the players have been asked the final number of questions or challenges.

To the extent there is more than one player, the players may be in the same room or playing over a communication channel such as an Intranet or the Internet. When the present invention is being used strictly as a learning tool, the student and teacher or tutor may be in the same location, or the student may be in one location while the teacher or tutor is in a different location, but receiving the responses or scores of the student.

The game or learning tool can utilize questions or challenges for a variety of subjects, with varying difficulties for players of different ages and experiences. For example, if a seven year old boy is playing against a 35 year old man, the questions or challenges provided to each may be different in subject and also in difficulty of the particular subject. Further, the scoring may be handicapped for responses typical of a seven year old and a 35 year old, to better approximate a level competition. To the extent either of the players have previously played the game or used the learning tool, there may be a history in the database 16 that handicaps one of the players further. Also, if there is a history of the two particular players against each other, additional handicapping may take place.

The database 16 described herein may be the same one containing the questions or challenges, however, a separate single or multiple database can be incorporated into the system 10 such that information for handicapping or questions or challenges may be accessed from a communications network such as the Internet.

The questions or challenges can be selected from various levels or they can be selected from a specific difficulty level. Scoring can be determined and a suggested difficulty level can be displayed to a player. In this manner, a test game can be executed and the system can determine the optimal level of difficulty for that player. Questions or challenges can be provided for different subject matter. Game play may involve less serious subject matter such as entertainment issues or sports questions, while more serious questions can be used for formal tests, test preparation, simulations or game preparation, although neither type of use is limited to any particular subject matter. Also, both more and less serious questions can be used for personal and group competitions, age specific players, physical and mental rehabilitation, therapy and challenges.

Again, the subject matter of the questions or challenges are not limited to any particular subject and can include current events, entertainment, history, math, spelling, English, geography, science, health, life issues that involve common sense and street sense, laws, sports and trivia to name just a few. Each of these subjects can include questions or challenges of difficulty from very low or easy to very high or difficult, with players' handicaps ranging from very low to very high and being based on, for example, age and weight.

Further, the questions or challenges can be multiple choice with the number of options only being limited by the number of sensors. Commonly, there would be three or four sensors, and thus, three or four multiple choice answers. However, two sensors can be used for true/false type questions or challenges, and matching type questions or challenges can be used with three or four sensor options. For example, the system can incorporate six keyboards and five sensors, but this can be scaled up as necessary. The time in between questions or challenges can be programmable and can be based on the number of questions or challenges to be asked (in an allotted time) or based on the amount of time for the game play or study session.

The present invention can provide rewards to players based on their scores against themselves or against others. The players may receive coupons from various sponsor or advertising companies or each player may accumulate points and use those points to purchase products or services. The players with the highest scores or winners of competitions may receive gifts. There can be different tests or qualifications for skill level associations and special benefits. Further, players or users may compete for state, national, and international rankings and prizes.

In general, users or players are competing against the computer selected questions or challenges, the timer, and their own or other people's scores. Their current scores and ranking can be updated after each question, each subject or at the end of a game or session. It is the players' strategy and intellect that dictates whether they ultimately improve their scores or win a competition.

The variety and types of subjects, levels of difficulty, and automatic operation make the present invention perfect for players of all ages whether preparing for formal tests, expanding personal knowledge, or competing against family members, friends, or others, in-person or online.

Further, the present invention allows for revisions to the questions or challenges such that the game and the questions or challenges are always current. Variations to the game play can be created to make the present invention a television game show or a video game. Further, the system has the ability to randomly or force the order of questions, challenges or test taking. The forced order provides teachers and trainers with the ability to control the testing. This forced order also provides the ability to control and change how online entertainment is viewed, as described herein.

The present invention can be used as a concussion test to measure the cognitive state of patients, including athletes, after a head impact, and for identifying congenital neurological conditions or disorders such as Autism Spectrum Disorder, Alzheimer's and as therapy for these conditions. In addition, the present invention can be configured for athletic pre-game preparation, detecting speed and power responses to surveys, tests and simulations for these and many occupations including police officers, military personnel, firefighters, pilots, doctors, and nurses. As such, the present invention can be configured to calculate, assess and compare mental fatigue against physical fatigue.

The present invention can also be used for social networking with groups formed for competition and/or the sharing of results, experiences, and thoughts. In addition to Internet based games, the present invention can be used as a standard testing mechanism for SAT, LSAT, MCAT, GED, driver's tests, admission and promotions exams, etc., as well as for interactive entertainment, interactive educational classes, organizational instructions, video books, instant research surveys, instant auctions, and many other functions normally conducted on paper or on an online form without the video, conviction measurement, and interactive elements.

As described herein, the present invention is a system 10 used as a learning tool or as a game both for fun and learning that can run or operate a software program and can be configured in various formations. In the preferred embodiment, the system 10 is made up of a microprocessor-based device with a video display 20 and audio capabilities 18. The system 10 is connected 24 by wire or wirelessly to a number of sensors 12, which act as input devices and are configured to receive and detect contact by a user or player. Among other functions, the sensors 12 can determine the time and magnitude of the user's contact and can transmit a signal containing that information.

Many different types of sensors can be used in the present invention without departing from the scope of the invention described herein. As such, the present invention may utilize wired or wireless sensors with high impact 3 axis accelerometers. The wireless sensors may have a communication range of up to 100 feet. The system may also utilize micro wireless sensors with low-medium adjustable 3D accelerometer in the 2 G to 24 G range, or micro wireless sensors with high impact 3 axis accelerometers. Gyroscopes may be used to provide additional information including the direction of impact.

All of these sensors are configured to communicate with the present invention whether a stand alone system or using an existing platform, such as a computer. Further, the system is configured to use the same sensors for different types of activities, such as mental games, wherein the direction represents an answer, and the force and response speed represent the user's conviction of that answer. Those same sensors can be used for sports training and testing, and for competitions, where the number of impacts, the force of each impact and the speed and accuracy are tracked. Further, those same sensors may be used for weight training, where the number of repetitions and the pressure of the weights can be tracked.

As described above, wired or wireless sensors can be used in the present invention. Wireless sensors provide a freedom to operate in which the sensor and device housing the sensor does not have to be tethered. The wireless sensor operation allows the accelerometers and gyroscopes, if included, to collect impact readings, while the sensor microprocessor translates the impact readings to keyboard strikes. The sensor microprocessor then communicates the keyboard strike number using, for example, the sensor's Radio Frequency (RF) module to either an RF dongle or to a Multiple Wireless Receiver (MWR).

The RF dongle plugs into a USB port of a device or device adapter and communicates wirelessly with the particular sensor. Based on this configuration, one dongle is needed for each sensor. The WMR, however, may be a separate device or a super dongle and is able to communicate with a high number of wireless sensors simultaneously. As described below, the MWR tracks each separate sensors using an assigned numbers scheme.

In this setup, the system may have one sensor tied to one dongle, multiple dongles can be plugged into USB ports, however, more than two wireless sensors may require the WMR. The WMR can communicate directly with a mobile device or a computer either through the USB port or using a wireless standard, such as Bluetooth.

As described herein, the score or results can be displayed on a mobile device, such as a cell phone or tablet, on a computer, or can be stored and/or displayed online. Thus, the system allows for multiple types of readings from multiple wireless sensors, assisting in tracking repetitions, pressure, impact, heart rate, calories burned, or other metrics.

In order to accomplish the tracking of the various sensors, each sensor will have its own designation. By assigning identifiers to each sensor, corruption caused by simultaneous impacts can be avoided since the program can be set to ignore certain inputs. The system can also assign offensive and defensive assignments, such that the striker or sender is separate from the receiver. This is especially important in combat sports, baseball, and football. Sensor designation also helps monitor impacts absorbed by person as well as those delivered, for example, senders on arms and legs, receivers on midsection & head. Further, the heart rate can be tracked separately and calories burned can be included in the workout results.

With WMR configuration and multiple players or athletes, or multiple targets, the system can assign specific sensors to specific people as well as offensive or defensive roles. The system can create combinations of sensor types for different types of players or athletes.

Also, sensor placement can be determined by the types of sensors and their role in the system. For example, impact sensors can be placed on the body, such as wrists, arms, forearms, ankles, legs, and waist. Impact sensors can also be placed on equipment, such as gloves, bats, sticks, golf clubs, balls, shoes, headgear, shoulder pads, and clothing. Further, impact sensors can be placed on targets, such as nets, heavy bags, free-standing targets, hand-held targets, and sports targets.

Meanwhile, pressure sensors can be placed on equipment, such as gloves, and power grips, while health monitors can be placed on various locations on the body, such as wrists, arms, and chest to keep track of the user's vital signs. Further, the use of pressure sensors in a glove, for example, can register not just the strength of the grip, but also the amount of weight being used in a weight-lifting exercises. Similar pressure sensors can be placed in shoes for the same purpose. With these pressure sensors, working in concert with low-impact accelerometers, an entire fitness workout can automatically be recorded and tracked by recording the weights used and repetitions performed for each and every exercise, thus obviating the need to write down the "workout" information. As with the workouts described herein, these scores can be remotely monitored by trainers, therapists, doctors, among others, either by using the raw data or through the use of the web based system described herein.

Also, sensors can be placed or affixed to independent, lightweight, rigid material, or transmission media, to expand the reach of the sensors on a target. Such placement will allow for the recording of any movement of the transmission media rather than the movement of the target.

There are a number of different scoring options, depending on the training and testing or game being deployed. Some examples include scoring based on the power measured by the G-force impact of a strike with sensors on the body or the target. For example, the impact has to exceed adjustable preset threshold to count and a recoil timer can be set at 400 ms to avoid false hits. The system can convert the score to PSI for 4 different weights of heavy bags, such that the sensors on the targets give higher scores when the strike is closer to the sensor, rewarding accuracy. Sensors on the body may make target type irrelevant in scoring.

Further, speed shots divide the power of the impact by the response time of the strike to calculate the combination of power & speed. Pure speed can be a measure only of the response time of each strike, the power can be pre-set in this embodiment. Also, burn out can measure the number of quick strikes and their power during an interval. In this example, the recoil timer can be set at a lower rate, such as 230 ms, to permit more hits/second.

For mental training and testing where the answer is relayed through a sensor, for example, the score can be multiplied by 1 for an accurate answer and by −1 for an incorrect answer. The score can also be dependent on the power of the impact (for sensor use) multiplied by the difficulty of the question asked divided by the response time to answer the question. This scoring example results in positive scores for correct answers and negative scores for incorrect answers.

For mental training and testing where the answer is relayed through a keyboard, for example, the score can be multiplied by 1 for an accurate answer and by −1 for an incorrect answer. The score can also be dependent on the pre-set power of the impact multiplied by the difficulty of the question asked and divided by the response time to answer the question. Up to 6 answer choices can be provided when using the keyboard rather than the 3 choices allowed with the impact sensors.

Scoring for mental training and testing can be customized to a particular person by establishing a baseline. After initial testing, subsequent scores for that particular individual are then compared against the baseline rather than a raw score. The power of the conviction in their responses can be measured as a percentage of their maximum hit during their baseline testing. The baseline could also be established for a group rather than an individual so the scoring is relative to the group baseline.

For subjective mental training and testing questions or challenges, the accuracy multiplier can be eliminated, the difficulty of the question is eliminated, and the response timer and conviction indicator can also be disabled. For subjective questions where the user's conviction is not a necessary component, such as "how many hours did you sleep last night?", these functions or aspects of the system can be disabled.

The mental training and testing program can employ either the sensors or the keyboard, as described above, or the program can work with both at the same time. For example, the first question could be answered with the keyboard and the second question can be answered using a sensor. This setup permits the combining of physical and mental challenges and increases the flexibility of the challenges.

Further, the conviction score may or may not be displayed as a separate score element and/or as a building or growing score for each question or the for the total test or game. The score or scores can be graphically displayed for the user or the trainer to review and track. The system can be configured to display or show the power of a sensor impact as a score, and as a graphic percentage either of the raw maximum, or of the user's maximum as established from that particular user's baseline. Both the length of a key depression, and the number of key strikes can be displayed as visual graphs that the user can view in real time and adjust their level of conviction accordingly, based on this visual. The conviction score or element can either be part of an overall question answering timer (the maximum conviction is reduced by delayed response to the question) or as a separate timer that starts when the question is answered (all conviction aspects are of equal length). Each of these timers are adjustable and controlled either by the trainer, administrator or the user.

As described above, the mental training and testing program either as a stand alone system or using in whole or in part, an existing platform (game console, computer, etc.), can be used in numerous types of testing, such as instructional courses and tests, standard aptitude tests and test preparation and concussion tests. The program can also be used in simulations, such as military, police, pilot, athlete, and firefighter simulations. Further, the program can be used for games and entertainment, such as books on video with comprehension games, brain fitness and entertainment games, and interactive entertainment. The program can also be used for personality tests and opinion surveys, mind & body fitness exercises & monitoring, and even for social networking using a web based program.

As an example of a subjective question and answer, a firefighter can be asked "how tired are you right now?" With this subjective question, the response timer can be disengaged or turned off and the answer is considered accurate or correct. The firefighter's answer is simply recorded and listed in a results file. These subjective answers can then be correlated with the objective answers to help determine cause and effect.

The mental training and testing system can utilize audio and video content or media in its operation. As such, the program presents custom and standard content videos that provide instruction, information, entertainment and action or opinions. The content can be provided in a specific order, or it can be left for the user to decide on the order that the content is provided.

The mental training and testing system can be customized to provide a program for all needs. The system can determine the number of questions or challenges per game or per test, and these questions or challenges can be comprehensive of specific subject material or be general questions or challenges and can be presented randomly or in specific order within each subject. The questions or challenges can also be presented with a set number of questions or set level of total difficulty, grouped by subject or difficulty level and drawn from an entire pool or a sub-grouping of a pool of questions or challenges.

The questions or challenges can be presented as various types that most users are comfortable with, such as multiple choice, true/false, matching, short answer, or short essay. Further, the questions can be objective questions with right and wrong answers, subjective questions with information from player, or subjective questions with opinions from player. Because of conviction, every question can be a scale.

The mental training and testing can provide a number of different answer methods, such as striking and manipulation of keyboard and/or screen on computers, tablets, and smart phones. The system can also incorporate impact sensors, such as three separate sensors to record the answer choice, wherein the force of the strike on a specific sensor indicates conviction of the answer. The impact sensor may also incorporate a gyroscope to determine the direction of strike/movement to indicate the answer, and the force of strike/movement indicates the conviction of the answer.

Pressure sensors with a gyroscope can be used such that the direction of movement indicates the answer, and the pressure applied, number of times pressure applied, or length of pressure applied indicates conviction of the answer. Also, sound and voice recognition can be implemented through a device, such as a microphone, a camera, or a web camera.

The mental training and testing can also be configured to set a time limit on every answer period, which can be an adjustable, pre-set limit in number of seconds. The system can determine what happens when time expires, for example, move on to the next question with no points awarded (or points deducted), right answer provided with no points awarded or deducted, or the game can be concluded and started over.

If desired, the program can provide answers, indicating the answer chosen in red and correct answer in green, or the correct answer can be provided in a video. The system can trigger Answer-based responses, such as general right or wrong answer, specific right or wrong with a teaching opportunity, or general "you missed the prior question, here's your next."

The mental training and testing program can track personal progress overall and by subject. Progress reports can be shown at pre-set points during and after testing, while the program automatically directs the user to normal, remedial, or advanced videos or tests as score dictates. The program can also provide different levels of feedback, such as "good", "OK", "poor" for encouragement. The reports are based on accuracy or scoring compared to pre-set thresholds, such that poor performance can lead to the game/test to shut-down and can direct the user to contact trainer/teacher for personal follow-up.

The results at the end of the game/test provide overall, subject groupings, and individual questions scores and comparisons, such comparisons against best, last, or average performance for that player or against another player, or against average of group. The program can also add individual score to the cumulative score for that player to help track level and frequency of participation, which can be used to elevate players to the next level, used as tracking system for therapy, or used as basis for rewards system.

The system can also provide graphs of personal scores to separate accuracy from scores, graph number right in each test, graph overall performance, by subject, and individual questions and compares against personal rolling average, and stores results for uploads to applications and web sites.

Further, the system can conduct real time game competitions, in which for example, multiple players take the same test at the same time online. This amplifies the importance of response time in score and makes cheating nearly impossible.

The question pool or pools used in the system can be refreshed through automatic downloads to assure variety. These pools can be provided to update subscribers, can be topical news, sports, and entertainment, can be general brain fitness questions or challenges and can be additional subject-specific questions or challenges.

As described herein, the system determines scoring baselines for later comparisons, such that it uses a first test or tests to establish power range for a user and then scores on percentage of maximum force rather than raw score. This baseline can also be used to assign handicaps in competitions.

To incorporate conviction into the scoring, the system measures the response time to answer the question, for keyboard strikes, manipulation of touch screen and impact sensors. For keyboard strikes, the length of the strike, the number of key strikes in pre-set time limit, and the combination of key strikes are all determined. For the manipulation of the touch screen, the size of the hand press and the number of visual objects pressed can be used to determine conviction. For the impact sensor, the force of strike, movement, or pressure can be used for the determination as described herein.

Once the answer and conviction is determined, the program records and tracks convictions of opinions and stores in results file as separate group within the game/test. This information can be correlated to the objective answers in that game/test, and can be uploaded to each relevant receiver for survey groupings.

In order for the system to successfully use keyboard strikes to determine a user's score, the keyboard depression must be checked for accuracy, but the system also determines the amount of time for each response as well as the amount of time for the total for all responses. These time measurements reflect the desire of the respondent to answer as quickly as possible to score a higher number of points both on that particular question and for the entire test or game as a whole.

The system measures the conviction of the user's answer and, in theory, minimizes guessing. This can be done when the user strikes one of the impact sensor pads with a force consistent with the certainty of the response. This can also be done by squeezing one of the pressure sensors with a strength and/or duration to reflect the certainty of the response. And this can be done through the manipulation of the answer key—either the time duration the key is depressed within a designated time frame, the number of times the key is depressed in a designated time frame, the combination of key depressions that signify answer and conviction. or the size of the imprint upon a touch pad screen.

All of the platforms described herein recognize keyboard depressions. To make the system ubiquitous across all platforms, such as pc, Mac, Linux, iPad, Android, and Blackberry, the sensors can convert captured scores to keyboard depressions. This methodology permits direct input of the sensors to the computer, tablet, or phone or permits communication through a Bluetooth keyboard.

The user's conviction is established since the system provides pre-set equal to or greater than negative scores for incorrect answers. The severity of the negative multiplier can be determined by the administrator, and the system can be programmed to end games at designated points determined by the score including for example, a positive score below a designated threshold, a total negative score at the designated points.

This sense of conviction can also be personalized by the present invention. A user's maximum impact can be measured and established as their baseline. All future strikes by that user become a percentage of that baseline. In training and survey responses, this provides a truer measurement of that user's belief. In competitions, this levels the scoring between individuals of different ages, weights, strength, etc.

As part of the program's scoring equation, the level of difficulty of the question or task is used as a multiplier. The higher the level of difficulty, the higher the possible score. The administrator can determine this level for each question, and the different levels can be randomly inserted in the question pool or grouped within the question pool. Users can answer questions of different levels of difficulty or select the difficulty level they wish to answer.

The present invention can distinguish between objective and subjective questions and track the responses accordingly. The conviction portion makes every answer a scaled response. The subjective questions can relate to the user's mental or physical health, or reflect their opinions on subjects, news events, policies, people, performances, etc.

The present invention uses an implied scoring to different measurements, such as PSI and distance, and alternate placement of the sensors. For example, accurate inferred conversions can be drawn for impacts to heavy bags to PSI for bags weighing 70, 80, 100, and 120 lbs. This results from controlled engineering tests that provided consistent results for scoring with medicine balls of different weights released from a number of different heights.

This implied scoring also permits a conversion for impacts upon a target from hands, feet, sport bats or sticks, or less-lethal impacts of police and military. The scoring for direct hits upon the target area can be implied by first testing the impacts in the more direct, but more exposed position on the target to gauge the energy absorbed by the target when the sensor is moved to a more secure position during the actual use. For example, the sensor on the back of a BOB target consistently provides 82% of the score registered by the sensor right above or below the point of impact during controlled testing. Thus, impacts on the front of the target with sensors on the back are adjusted to reflect the safer positioning.

The present invention may further include a tool that records, tracks, and shares performance information and encourages regular participation through reminders, pressure, and rewards. This motivator tool acts as an intermediary between the system and both the athletes and users who use them and the people who monitor the users performances.

The motivator tool collects the total workout results and the total game results from the mental training and testing to provide a detailed summary of all related activities and tracks these scores for individual and group totals. These total scores become the basis for macro progress tracking and widespread comparisons. Just as each of the programs provide real time comparisons against the user's prior performances for each technique, question or subject within a specific workout or game, the motivator tool provides cumulative comparisons versus goals, versus other users, versus other time frames, or other criteria designated by the user.

The motivator tool is a living report card or permanent record of performance with separate scores depending on the various programs, along with health sensor data. The motivator tool can also be configured to track frequency of activity, and calculates a macro picture of individual performance both in participation and scores.

The scores can be raw as well as provide averages per performance or per day over the designated time frame. The scores can also be added to other scores within the designated group to track a larger performance. These scores can be sent to specific monitors or trainers in the different areas or even posted on social networks either automatically or as directed by the user.

Prior to any activity, the motivator tool communicates with the user or athlete/player to encourage participation. It automatically reminds the athlete/player that it's time for a workout or that a designated number of days has passed since the last workout or that they still need to earn a specific number of points to reach their goal. These reminders can be in the form of computer messages, blinking icons, text, emails or audio statements. The types of messages are determined in advance and increase in intensity as days pass. These reminders force the athlete/player to consciously decline to participate.

The motivator tool also notifies the athlete/player when one of their designated friends or group partners has updated their totals. Conversely, the motivator tool can inform friends/group partners/trainers/monitors that the athlete/player is behind schedule. The system also provides a reward system in the motivator tool. It rewards frequency of activity, performance scores, or some combination of frequency and scores by adding fun program features and bonus materials. It also informs the athlete/player when they've progressed to the next level of challenges. And it shares exceptional participation and performance records publicly.

These steps are designed to provide the peer pressure that is so successful in training and testing. People train more often when they have a partner or they have a personal trainer or they're part of a group/club or they go to a class. They need to do the activity or feel the guilt of canceling or wasting their money. The motivator tool automatically adds this proactive element of reminders, rewards, and sharing to provide similar motivation.

The present invention may further include a web-based platform that enables anyone to create their own mental or physical interactive course that instructs through videos, monitors performance in real time, provides immediate encouragement or remedial steps based on the performance, and tracks scores for personal progression, group performances, and worldwide comparisons.

In this embodiment, the present invention provides an instructional template where a facilitator, such as a teacher, trainer, or doctor, can create their own videos and text within the framework. The facilitator creates their own videos, write their own questions and answers, and determine their own answer-related responses. The videos and questions are not limited to right or wrong, but can capture opinions with the conviction of their response turning every subjective answer into a scaled response. These subjective responses can be used for correlations to the objective performances or simply separately tracked for surveys.

The scoring is a combination of accuracy, response time, difficulty of question/task, and the power of conviction that the answer is right. The technology measures this conviction through one or more of the following: the striking of impact sensors, the squeezing of pressure sensors, striking and squeezing a combination of the two sensor types, and the timed depression of keyboards, and touch pads.

The monitoring works with or without additional hardware; the subscriber has the choice. In this application, the power of wired or wireless sensors is converted into Bluetooth keyboard strikes. This eliminates the need for a trainer and permits the web-based application. This web-based platform includes the features described herein that provide different video progress and action reports based on established performance thresholds. Additionally, this embodiment can guide the user or subscriber to specific action steps, such as redoing a lesson, taking an easier lesson, or lowering the difficulty level of the questions.

Further, the amount of information displayed to the subscriber is determined by the administrator or instructor. All the information is captured, but unnecessary data can be hidden from the subscriber to simplify the display and add privacy to the data collection.

The present invention can capture and track all subjective and objective information for all subscribers and generate full and exceptional reports for the instructors, depending on their needs. Report can be generated on individuals and groups and on the overall and the subject specific. Additionally, the web-based aspect permits public sharing of scores and comparisons and rankings in an almost unlimited number of areas.

The present embodiment can include a number of subsystems, such as a teacher administration panel, which allows each individual teacher to setup course billing options, course marketing information for the global course store, build their training and testing programs for their students, monitor student results, provide feedback to students and generate reports; a student course panel that presents the course training and testing as defined by the teacher, gathers student response input, shows real time performance data, displays historical data and account administration; global course and sensor store that provides a searchable course list of public courses and includes each teachers course marketing information, reviews from course attendees, course fee and billing method (recurring or one time), and proprietary hardware sensors for use with the specific courses; and the backend that handles all system hosting, billing, database management for each course, teacher and student, and report generation.

This embodiment consolidates the system and provides it to users through a web-based system that converts everything to keyboard strokes. The entry for instructors is easy and the training and testing for the subscribers is fun, effective, and personal.

The present invention overcomes the individual operating system restrictions to custom sensor inputs by translating all data into keyboard strikes, thereby allowing custom sensor data to be sent through a ubiquitous interface to all host platforms. For example, an impact sensor could measure a 10 g strike, convert it to a keyboard input of a 1 followed by a zero followed by a G and the application can convert the keyboard input back into the Actual 10 G reading. This method works with all types of sensors, such as temperature, pressure, gyroscopes, GPS, security, heart monitors, and all systems that interface with a keyboard.

The present invention may further include an embodiment that includes an interactive element to television shows, either rebroadcasted from their original airing or produced specifically for online viewing. The viewing experience becomes personal with content driven by current and past subject choices, and current test performance in accordance with the present invention described herein. This embodiment allows for immediate viewing, immediate feedback, next action steps and submissions for competitions.

This embodiment uses the existing platform for all types of online programming, which encourages personal choice and participation, adds interactive elements to entertainment programming, including instant tests, instant opinions, instant decisions, physicality, a video game aspect and conviction of responses.

With this embodiment, viewers give their opinions, take action steps, decide what they see next, and take quizzes on the materials they watched. Users indicate personal preferences and program and adjust priority of choices. These choices could be based on their prior answers or other choices.

Accordingly, the system provides immediate feedback to users, providers, relevant parties, survey companies, and objective competition. This allows for rewarding viewership frequency and length and incorporates a physical element in some entertainment or can count as extra credit, and answers users' or viewers' need for instant gratification, customization, unobtrusive advertisements, meaningful participation and competitions.

Both providers and viewers must be subscribers, however, the host starts and ends programs. This provides advertising opportunities, as host makes offers at end of show for those who watched it all and provides for product placement. Every video is "brought to you by" with short roll at top of video.

Viewing is not dictated by time of show, since the shows can run all day long and can be watched multiple times. Users can quit watching at any point and can start at the same point within program if interrupted during prior viewing. By including the present invention forced viewing order, the user can emulate home DVR to start video from the departure point, which is not possible with normal online viewing. Each video can be segmented to force the viewing in order of the segments. Further, a viewer goes to another site at the end of a segment, when they return, the system automatically starts with the next segment. Bonus material or prizes could also be provided with frequent viewing and superior objective performances.

The list of programming types is unlimited, such as news, variety shows, reality shows and competition, scripted shows, game shows, exercise programs, infomercials and video blogging.

Figure 2A:
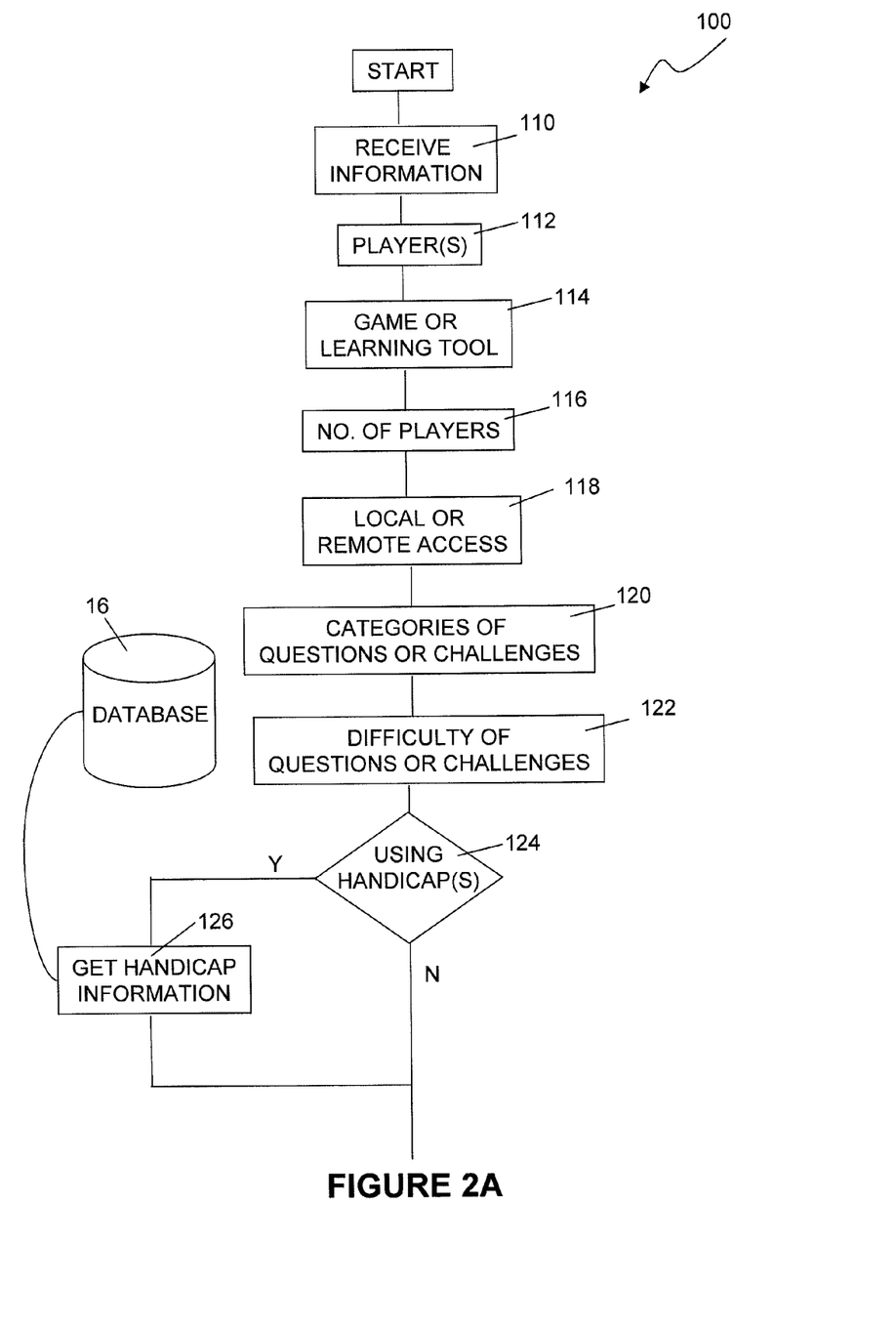
FIGS. 2A and 2B illustrate a flow chart of an exemplary computer system according to the present invention.
Figure 2B:
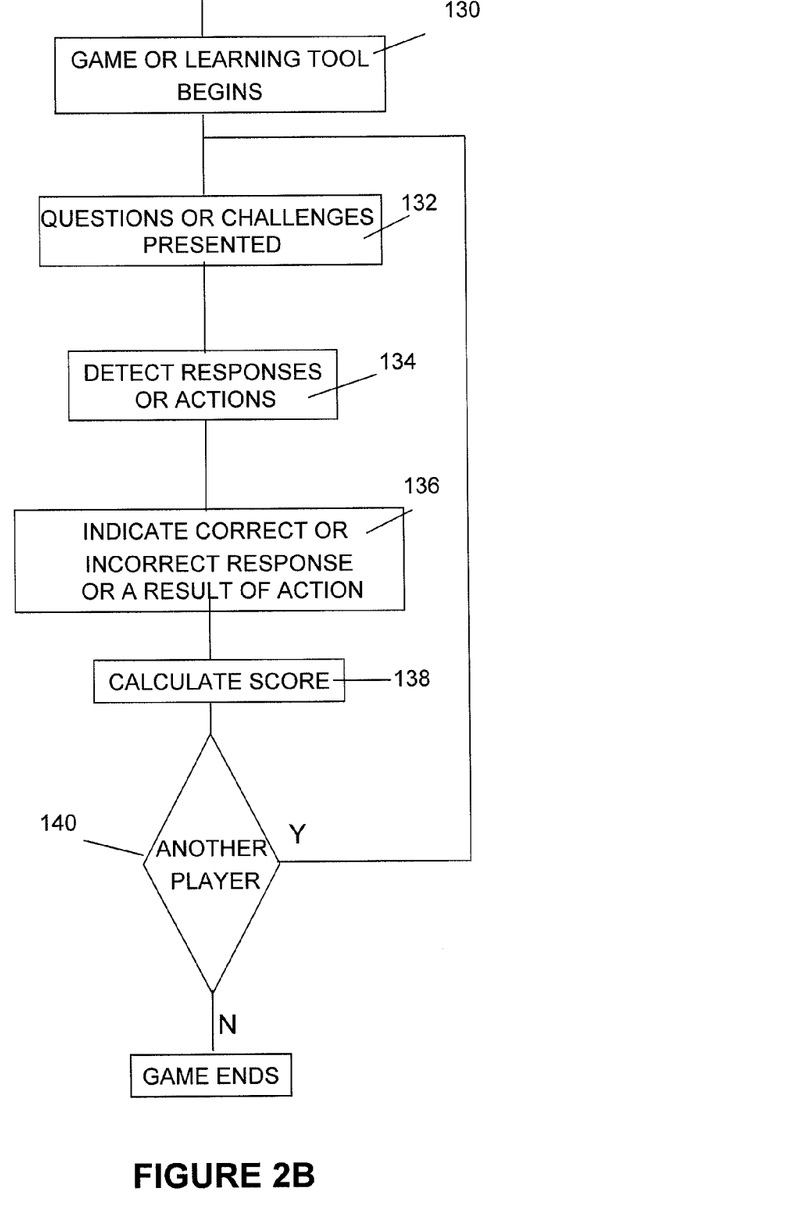

FIG. 2 shows an exemplary flow chart of the learning tool or game 100 as utilized or played by providing questions or challenges to the user. The user or player responds to the question or challenge by striking one of the sensors that corresponds to the correct answer to the question or to act in response to a challenge. The sensor transmits the contact information to the computer where it is analyzed to determine the conviction of the answer or the result of the player's action. The system then calculates a score for that player to be used against that particular player or other playing against the player.

Initially, a player must indicate information to the system 110 as to who the player is 112 and if the player will be playing a game or using a learning tool 114. In this example, the player chooses to play a game. The player must indicate if the player is playing alone or with another player 116 and whether that player is in the same location or in a remote location 118. To the extent the player is located remotely, the players must establish a communication link (if not already established).

The display will ask these and other questions or challenges to establish the boundaries for the game. The display can use colors or shapes to assist in responding to these initiation questions or challenges. Once the information is established, the players must then decide the category or categories 120 from where the questions or challenges will be asked, and the level of difficulty for the questions or challenges 122. Next, the system can be told to handicap 124 each player based on past performance or based on self-handicapping input 126 from the database 16. To the extent necessary, the system can monitor the answers and dynamically handicap one or both players as the game proceeds.

The game is then activated and proceeds automatically 130. In the question and answer embodiment, each question is provided 132 with a number of multiple choice answers, each of which corresponds to one of the sensors, and only one of which is correct. A virtual game host can visually present each question with videos, photos, audio and text. Each player must answer each question 134 by striking a sensor with as much speed and force as is consistent with their conviction or certainty that they are supplying the correct answer. The display can indicate correct and incorrect answers on the screen 136, for example, by showing the correct answer highlighted in green, and an incorrect answers displayed in red.

In some games or tests, the goal is to correctly answer as many questions or challenges as possible in the allotted time. In other games, the number of questions or challenges is predetermined and the player may be allowed to repeat incorrect or unanswered questions or challenges. Either way, the system calculates and keep track of the scoring for each answer 138, which incorporates, in one example, whether the answer was correct or incorrect, multiplied by the power or magnitude of the answer, divided by the response speed, multiplied by the question's level of difficulty, and then multiplied by the activated handicap. For wrong answers, the player either receives zero points or even can be penalized the same number of points (using the same calculus as if the answer was correct).

During game play, players can skip a question by either allowing the maximum time (for example, 10 seconds) to elapse, or by pressing a button to skip to the next question. By skipping the question, the player does not lose points as if the incorrect answer was given.

After each question or each subject, the score and ranking at that point of the game can be immediately updated and an appropriate audio and video response is played.

After each question and answer, objective variance analysis and feedback compared to the player's previous responses or compared to the other players responses are spoken and displayed. In one embodiment, a player may fail the game and the game may end (for that player) if the player has a negative score at the end of any particular subject.

The game automatically moves from one subject interval to the next until the player completes the entire game and the overall score for the entire game and scores and feedback for each subject are spoken and displayed. The game automatically moves to the next player 140, or if there are no more players the game ends.

The scores for every subject of every test are automatically saved for each player so a player can track his or her progress over time in both table and graphical formats.

The same format can be used to challenge a player or players in which each player must take an action, such as kick boxing, punching, weight-lifting, and the system records, tracks and scores each player's response or action to the challenge. The scores can be shown on the display as scores, in graph format or in any other format that compares the player to earlier scores or the players to each other.

As described above, an impact sensor could be used in the present invention and during such use, may record or measure an impact of 10 Gs, for example. The sensor may be configured with an onboard microprocessor, such that the force of the impact can be converted and transmitted such that the impact transmits the equivalent of a keyboard describing the impact, i.e., a "1" followed by a "0" followed by a "G", as if those keyboard keys were depressed to describe the impact. As such, instead of the system receiving the equivalent of a signal representing a 10 G impact from the impact sensor, the system will receive a description of the 10 G impact, as though it was typed on a keyboard. The conversion of the recorded impact to a keyboard description of the impact, can occur at the sensor, or at a remote location, thereby allowing the system to read keyboard depressions and not sensor data. This method works with all types of sensors, such as temperature, pressure, gyroscopes, GPS, security, heart monitors, and all systems that interface with a keyboard.

The sensors 12 described herein are not limited to passive sensors that merely record an impact and transmit the information to the system 10. The sensors 12 of the present invention can act as their own Internet Protocol (IP) node on a network, sending information wirelessly through a router. In this arrangement, each sensor acts independently of the system 10 as a whole and provides information through a local Wi-Fi connection or even over a wireless communication system, such as a cellular 3 G system or its equivalent.

To the extent the sensors 12 are set up as their own IP address, a user merely needs to connect (wirelessly) to a Wi-Fi network or the equivalent, and users can play games in response to questions on a television show or over the Internet regardless of any access to a input-gathering system in their location. For example, if a game show is on television, and the user has registered, then the user can play along with the show's contestant to see if they would have a better score. The game show can incorporate the multitude of users into the show's idea.

Figure 3:
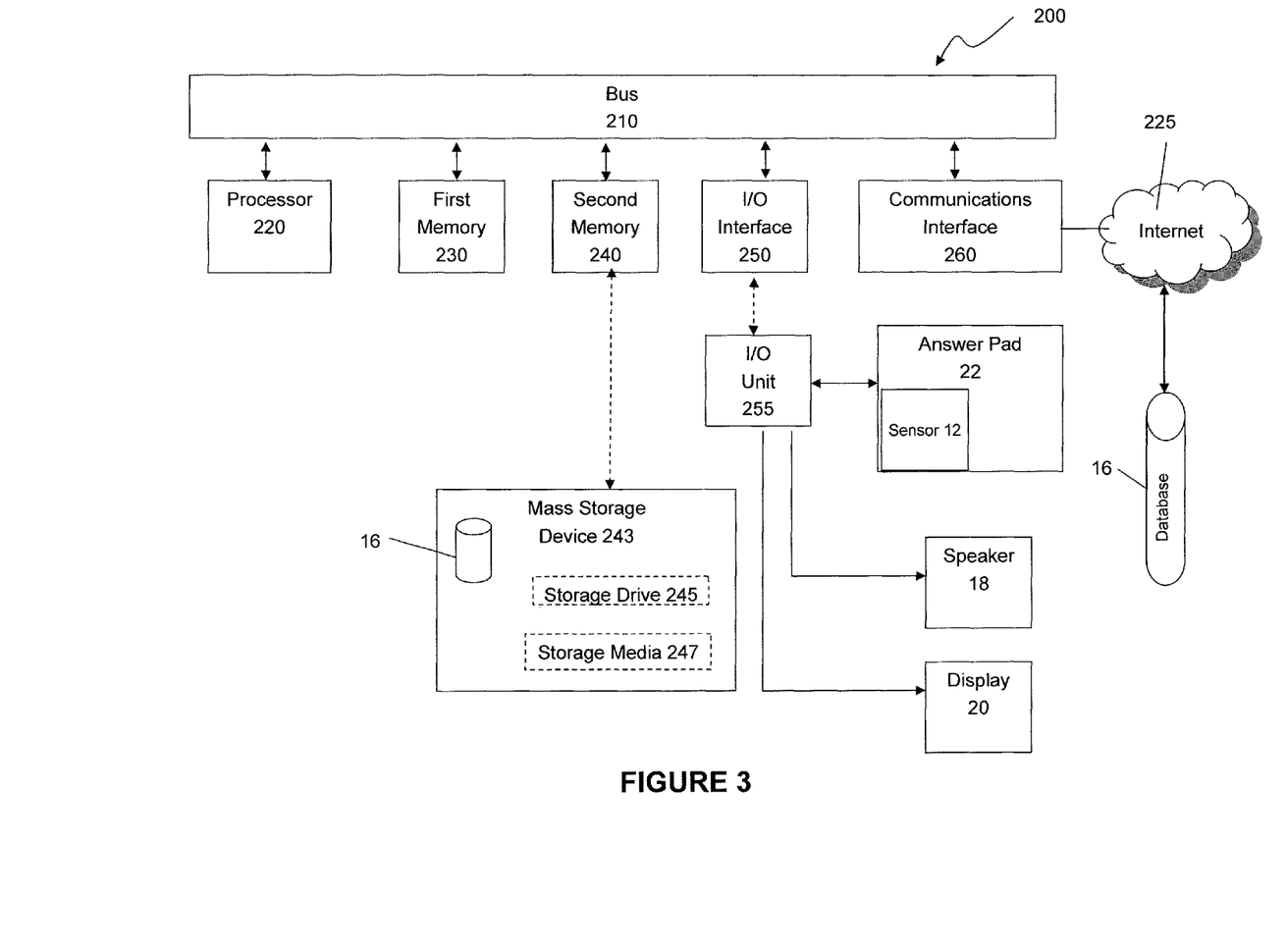
FIG. 3 illustrates a functional block diagram in accordance with an alternative embodiment of the present invention.

FIG. 3 illustrates a block diagram of an exemplary computer system 200 or network architecture, that may be used to implement the system and methods according to an embodiment of the present invention. One or more computer systems 200 may carry out the methods presented herein as computer code and one or more processors, such as processor 220, which may be a special purpose or a general-purpose processor is connected to a bus 210. As shown in FIG. 3, bus 210 connects the processor 220 to various other components of the computer system 200, but it is contemplated that bus 210 may connect processor 220 to components (not shown) such as, sensors, and servomechanisms.

It is also contemplated that bus 210 connects the processor 220 to other computer systems either through an intranet or over a global communications network such as the Internet 225. The processor 220 can receive software or computer code via the bus 210, and the term software or "computer code" includes, for example, programs, instructions, signals and/or data. The processor 220 executes computer code and may further send the computer code via the bus 210.

The computer system 200 may include one or more memories, such as first memory 230 and second memory 240. It is contemplated that the first memory 230, secondary memory 240, or a combination thereof function as a computer usable storage medium to store and/or access computer code. The first memory 230 and second memory 240 may be, for example, random access memory (RAM), read-only memory (ROM), a mass storage device, or any combination thereof.

As shown in FIG. 3, one embodiment of second memory 240 is a mass storage device 243, although it is contemplated that first memory 230 may be the mass storage device. The mass storage device 243 comprises a storage drive 245 and a storage media 247. It is contemplated the storage media 247 may or may not be removable from the storage drive 245. Mass storage devices 243 with storage media 247 that are removable, otherwise referred to as removable storage media, allow computer code to be transferred to and/or from the computer system 200.

A mass storage device 243 may include, for example, a Compact Disc Read-Only Memory ("CDROM"), ZIP storage device, tape storage device, magnetic storage device, optical storage device, Micro-Electro-Mechanical Systems ("MEMS"), nanotechnological storage device, floppy storage device, hard disk device. Mass storage device 243 also includes program cartridges and cartridge interfaces (such as that found in video game devices), removable memory chips (such as an EPROM, or PROM) and associated sockets.

The computer system 200 may further or alternatively include other means for computer code to be loaded into or removed from the computer system 200, for example, input/output ("I/O") interface 250 and/or communications interface 260. Both the I/O interface 250 and the communications interface 260 allow computer code to be transferred between the computer system 200 and external devices including other computer systems. This transfer may be bi-directional or omni-direction to or from the computer system 200.

Computer code transferred by the I/O interface 250 and the communications interface 260 are typically in the form of signals, which may be electronic, electromagnetic, optical, or other signals capable of being sent and/or received by the interfaces. These signals may be transmitted via a variety of modes including, but not limited to, wire or cable, fiber optics, a phone line, a cellular phone link, infrared ("IR"), and radio frequency ("RF") link.

The I/O interface 250 may be any connection, wired or wireless, that allows the transfer of computer code. An I/O interface 250 includes, for example, an analog or digital audio connection, digital video interface ("DVI"), video graphics adapter ("VGA"), musical instrument digital interface ("MIDI"), parallel connection, PS/2 connection, serial connection, universal serial bus connection ("USB"), IEEE1394 connection, PCMCIA slot and card. In certain embodiments the I/O interface connects to an I/O unit 255 such as a user interface, sensor 12 (here connected to an Answer Pad 22), monitor or display 20, speaker 18, printer, touch screen display, to name a few.

The communications interface 260 is also any connection that allows the transfer of computer code. Communication interfaces include, but are not limited to, a modem, network interface (such as an Ethernet card), wired or wireless systems (such as Wi-Fi, Bluetooth, IR), local area networks, wide area networks, intranets, etc. In this example, the communications interface 260 is connected to the Internet 225, either through a wired or wireless connection.

The invention is also directed to computer products, otherwise referred to as computer program products, to provide software that includes computer code to the computer system 200. Processor 220 executes the computer code in order to implement the methods of the present invention. As an example, the methods according to the present invention may be implemented using software that includes the computer code, wherein the software is loaded into the computer system 200 using a memory 230, 240 such as the mass storage drive 243, or through an I/O interface 250, communications interface 260, or any other interface with the computer system 200. The computer code in conjunction with the computer system 200 described herein may perform any one of, or any combination of, the steps of any of the methods presented herein. It is also contemplated that the methods according to the present invention may be performed automatically, or may be invoked by some form of manual intervention.

The computer system 200, or network architecture, of FIG. 3 is provided only for purposes of illustration, such that the present invention is not limited to this specific embodiment. It is appreciated that a person skilled in the relevant art can program and implement the present invention using any computer system or equivalent network architecture.

The described embodiments are to be considered in all respects only as illustrative and not restrictive, and the scope of the invention is, therefore, indicated by the appended claims rather than by the foregoing description. Those of skill in the art will recognize changes, substitutions and other modifications that will nonetheless come within the scope of the invention and range of the claims.

What is claimed is:

1. A method for determining the conviction of a response to a question in a physical or mental training and testing regiment in which the conviction corresponding to the response is determined by measuring accuracy, speed and magnitude of the response to the question, comprising a microprocessor, a timer, at least one input device, a display, a memory and computer software, said computer software being located in said memory and run by said microprocessor, said computer software comprising a conviction determination algorithm, wherein said conviction determination algorithm comprises the steps of:
   (a) generating a question to be displayed;
   (b) displaying the question on said display;
   (c) starting said timer at or about the time said question is displayed;
   (d) receiving a response through said at least one input device;
   (e) stopping said timer upon receiving said response to measure time elapsed from the starting of the timer to the receiving of the response;
   (f) determining if the response is accurate;
   (g) measuring the magnitude of the response;
   (h) ascertaining the conviction of the response based on all three of the accuracy of the response, the elapsed time to respond and the magnitude of the response;
   (i) returning to step (a) if additional questions are to be displayed; and
   (j) determining cumulative conviction of the responses based on all of the convictions ascertained in step (h).

2. The method for determining the conviction of a response to a question in claim 1, further comprising a network server, said network server allowing said question to be generated remotely from said microprocessor and transmitted to said microprocessor through a communications network.

3. The method for determining the conviction of a response to a question in claim 2, wherein steps (a) through (j) are provided to a plurality of users.

4. The method for determining the conviction of a response to a question in claim 3, wherein the cumulative conviction is determined for each of the plurality of users.

5. The method for determining the conviction of a response to a question in claim 4, wherein said steps (a) through (j) are provided to a plurality of users through said network server over a global communications network.

6. The method for determining the conviction of a response to a question in claim 1, further comprising a predetermined time in which said timer will delay before it starts.

7. The method for determining the conviction of a response to a question in claim 6, in which said predetermined time is determined as a handicap or an aid to equalize the conviction for a particular user.

8. The method for determining the conviction of a response to a question in claim 1, wherein said input device is one or more of a keyboard, a touch screen, an impact sensor, a computer tablet touch screen, a cellular telephone touch screen, a pressure sensor, an accelerometer, a pressure sensor with a gyroscope, and a microphone.

9. The method for determining the conviction of a response to a question in claim 8, wherein said input device is wireless.

10. The method for determining the conviction of a response to a question in claim 9, wherein said wireless input device communicates through either a radio frequency dongle or a multiple wireless receiver.

11. The method for determining the conviction of a response to a question in claim 8, wherein said input device is configured to convert said received response into a format that emulates a standard input format received from a standard keyboard.

12. The method for determining the conviction of a response to a question in claim 1, wherein said display is one of a computer monitor, a television, a computer tablet screen, a cellular telephone display screen.

13. The method for determining the conviction of a response to a question in claim 1, wherein said questions are multiple choice questions.

14. The method for determining the conviction of a response to a question in claim 1, wherein said questions are objective and based on an objective baseline plus or minus a handicap value, wherein said handicap value can be zero.

15. The method for determining the conviction of a response to a question in claim 1, wherein said questions are subjective questions and based on a subjective baseline determined prior to the question being displayed.

16. The method for determining the conviction of a response to a question in claim 1, wherein said questions require an audio response.

17. The method for determining the conviction of a response to a question in claim 1, wherein said questions are true or false questions.

18. The method for determining the conviction of a response to a question in claim 1, wherein said measuring the magnitude of the response is done by recording the impact of a strike on said input device.

19. A system for determining the conviction of a response to a question in a physical or mental training and testing regiment, comprising:
   a microprocessor, said microprocessor, a memory and a timer, said memory and said timer being coupled to said microprocessor;

at least one input device, said at least one input device being connected to said microprocessor to allow for a response, received by said at least one input device, to be transmitted to said microprocessor;

a display, said display being connected to said microprocessor and capable of displaying a question on said display;

said memory containing computer software, said computer software being run by said microprocessor, said computer software comprising a conviction determination algorithm, wherein said conviction determination algorithm comprises the steps of generating a question to be displayed and displaying the question on said display, starting said timer at or about the time said question is displayed, receiving a response through said at least one input device, stopping said timer upon receiving said response to measure time elapsed from the starting of the timer to the receiving of the response, determining if the response is accurate, measuring the magnitude of the response, ascertaining the conviction of the response based on the accuracy of the response, the elapsed time of the response, and the magnitude of the response, and if additional questions are to be displayed, generating a different question to be displayed.

20. The system for determining the conviction of a response to a question in claim 19, further comprising a network server, said network server allowing said question to be generated remotely from said microprocessor and transmitted to said microprocessor through a communications network.

21. The system for determining the conviction of a response to a question in claim 20, wherein the steps are provided to a plurality of users.

22. The system for determining the conviction of a response to a question in claim 21, wherein the cumulative conviction is determined for each of the plurality of users.

23. The system for determining the conviction of a response to a question in claim 22, wherein said steps are provided to a plurality of users through said network server over a global communications network.

24. The system for determining the conviction of a response to a question in claim 19, further comprising a predetermined time in which said timer will delay before it starts.

25. The system for determining the conviction of a response to a question in claim 24, in which said predetermined time is determined as a handicap or an aid to equalize the conviction for a particular user.

26. The system for determining the conviction of a response to a question in claim 19, wherein said input device is one or more of a keyboard, a touch screen, an impact sensor, a computer tablet touch screen, a cellular telephone touch screen, a pressure sensor, an accelerometer, a pressure sensor with a gyroscope, and a microphone.

27. The system for determining the conviction of a response to a question in claim 26, wherein said input device is wireless.

28. The system for determining the conviction of a response to a question in claim 27, wherein said wireless input device communicates through either a radio frequency dongle or a multiple wireless receiver.

29. The system for determining the conviction of a response to a question in claim 19, wherein said display is one of a computer monitor, a television, a computer tablet screen, a cellular telephone display screen.

30. The system for determining the conviction of a response to a question in claim 19, wherein said questions are multiple choice questions.

31. The system for determining the conviction of a response to a question in claim 19, wherein said questions are objective and based on an objective baseline plus or minus a handicap value, wherein said handicap value can be zero.

32. The system for determining the conviction of a response to a question in claim 19, wherein said questions are subjective questions and based on a subjective baseline determined prior to the question being displayed.

33. The system for determining the conviction of a response to a question in claim 19, wherein said questions require an audio response.

34. The system for determining the conviction of a response to a question in claim 19, wherein said questions are true or false questions.

35. The system for determining the conviction of a response to a question in claim 19, wherein said measuring the magnitude of the response is done by recording the impact of a strike on said input device.

* * * * *